United States Patent
Kamimoto et al.

(10) Patent No.: US 8,968,611 B2
(45) Date of Patent: Mar. 3, 2015

(54) PROCESS FOR SOLIDIFICATION OF PHOSPHORIC ESTER-BASED FLAME RETARDANTS

(75) Inventors: Tetsuo Kamimoto, Saitama (JP); Yuki Tanaka, Saitama (JP); Tomomasa Tezuka, Saitama (JP); Hisashi Murase, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/996,886

(22) PCT Filed: Jun. 9, 2008

(86) PCT No.: PCT/JP2008/060543
§ 371 (c)(1), (2), (4) Date: Dec. 8, 2010

(87) PCT Pub. No.: WO2009/150706
PCT Pub. Date: Dec. 17, 2009

(65) Prior Publication Data
US 2011/0084242 A1    Apr. 14, 2011

(51) Int. Cl.
C09K 21/12    (2006.01)
C09K 21/14    (2006.01)
C07F 9/09     (2006.01)
C08K 5/523    (2006.01)
B01D 9/00     (2006.01)
C08L 21/00    (2006.01)

(52) U.S. Cl.
CPC .............. *C09K 21/12* (2013.01); *C08K 5/523* (2013.01); *B01D 9/0036* (2013.01); *C08L 21/00* (2013.01)
USPC ............................. 252/609; 558/87; 558/156

(58) Field of Classification Search
CPC .............................. C09K 21/12; C09K 21/14
USPC ........................................ 252/609; 558/156
See application file for complete search history.

(56) References Cited

U.S. PATENT DOCUMENTS

| | | |
|---|---|---|
| 5,679,824 A | 10/1997 | Hirao et al. |
| 6,319,432 B1 | 11/2001 | Harrod et al. |

FOREIGN PATENT DOCUMENTS

| | | | |
|---|---|---|---|
| EP | 0509506 A2 | 10/1992 | |
| JP | 5-1079 A | 1/1993 | |
| JP | 5-320205 A | 12/1993 | |
| JP | 6-128195 A | 5/1994 | |
| JP | 8-40984 A | 2/1996 | |
| JP | 9-87290 A | 3/1997 | |
| JP | 10-504317 A | 4/1998 | |
| JP | 11-100392 A | 4/1999 | |
| JP | 2000198792 A | * 7/2000 | |
| JP | 2001-131339 A | 5/2001 | |
| JP | 2002-145880 A | 5/2002 | |
| JP | 2003-82159 A | 3/2003 | |
| WO | 96/16921 A1 | 6/1996 | |
| WO | WO 03/089442 A1 | 10/2003 | |

OTHER PUBLICATIONS

English machine translation of Oda et al. (JP 2000198792) 2000.*
English machine translation of Hirao et al. (JP 11-100392) 1999.*
"Satake Catalog", Satake Product Guide (no date).*
"Kurimoto Catalog", Powder Processing Equipment (no date).*
(Continued)

*Primary Examiner* — Peter F Godenschwager
(74) *Attorney, Agent, or Firm* — Birch, Stewart, Kolasch & Birch, LLP

(57) ABSTRACT

The present invention provides a process of solidifying a phosphoric ester-based flame retardant in which high-level purification is not required and stress load is not employed.

In the process of solidifying a phosphoric ester-based flame retardant, a seed crystal is added at a temperature of not higher than 55° C. and at an amount of 1 to 50 parts by mass with respect to 100 parts by mass of a phosphoric ester compound in a molten state, which compound is represented by the following Formula (I):

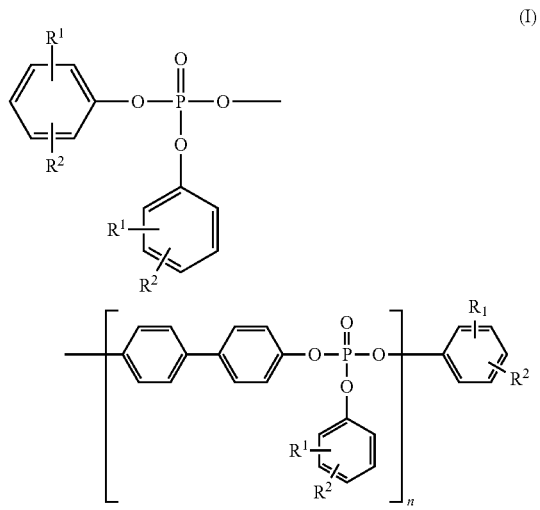

(wherein,
$R^1$ and $R^2$ each independently represent a hydrogen atom or a methyl group; and
n represents a number of 1 to 5).

It is preferred that the amount of the phosphoric ester compound represented by the aforementioned Formula (I) wherein n is 1 be less than 90% by mass and that $R^1$ and $R^2$ be a hydrogen atom.

7 Claims, No Drawings

(56) References Cited

OTHER PUBLICATIONS

International Search Report issued Aug. 12, 2008 for International Application No. PCT/JP2008/060543.
Office Action dated Jul. 3, 2012 issued in related Japanese Patent Application No. 2007-042990.
"Seed Crystal", Wikipedia, (May 1, 2008) Retrieve from internet URL:http://en.wikipedia.org/w/index.php?title=Seed_crystal&oldid=209553893 (retrieved on Feb. 20, 2014).
European Search Report issued in European patent application No. 08765334.1 on Mar. 4, 2014.

* cited by examiner

PROCESS FOR SOLIDIFICATION OF PHOSPHORIC ESTER-BASED FLAME RETARDANTS

TECHNICAL FIELD

The present invention relates to a process of solidifying a phosphoric ester-based flame retardant. Particularly, the present invention relates to a process of solidifying a phosphoric ester-based flame retardant in which the solidification can be achieved without performing high-level purification and applying stress load.

BACKGROUND ART

In recent years, in order to reduce environmental stresses, it has been investigated to replace halogen-based flame retardants with inorganic-based flame retardants such as phosphorus-based flame retardants and metal hydroxides.

As such phosphorus-based flame retardant, phosphoric ester-based flame retardants of resorcinol derivatives and bisphenol A derivatives are known, and these are used in polycarbonates and polyesters.

However, phosphoric ester-based flame retardants are in a liquid form or have a low melting point, and these flame retardants, when blended into a resin, exhibit plasticizing effect and deteriorate the physical properties of the resin. In addition, a blending device for liquid additives is required in order to blend such a phosphoric ester-based flame retardant into a resin.

As a process of solidifying a phosphoric ester-based flame retardant, Patent Document 1 proposes a process in which a solid flame retardant is obtained by allowing bis(2,6-dimethylphenyl)phosphoric chloride and resorcinol to react to produce a high-purity phosphoric ester. In Patent Documents 2 and 3, it is proposed to produce a solid flame retardant by applying stress load and using a seed crystal.

Patent Document 1: Japanese Unexamined Patent Application Publication No. H5-320205 (Claims, etc.)

Patent Document 2: Japanese Unexamined Patent Application Publication (Translation of PCT Application) No. H10-504317 (Claims, etc.)

Patent Document 3: Japanese Unexamined Patent Application Publication No. 2001-131339 (Claims and Examples)

DISCLOSURE OF THE INVENTION

Problems to be Solved by the Invention

However, the production process according to Patent Document 1 has a drawback in that it requires purification of bis(2,6-dimethylphenyl)phosphoric chloride in advance, and the process according to Patent Document 2 has a problem in that it requires a device where stress load needs to be applied, such as a kneader. Further, bisphenol A derivatives have a low melting point even when they are made at a high purity, and caking thereof is thus likely to occur during summertime. Consequently, it is difficult to store such bisphenol A derivatives over a prolonged period of time.

In view of this, an object of the present invention is to provide a process of solidifying a phosphoric ester-based flame retardant in which high-level purification is not required and stress load is not employed.

Means for Solving the Problems

In view of the aforementioned present circumstances, the present inventors intensively studied to discover that the aforementioned problems can be solved by adding a specific amount of seed crystal to a specific phosphoric ester compound, thereby completing the present invention.

That is, the process of solidifying a phosphoric ester-based flame retardant according to the present invention is characterized in that seed crystal is added at a temperature of not higher than 55° C. and at an amount of 1 to 50 parts by mass with respect to 100 parts by mass of a phosphoric ester compound in a molten state, which compound is represented by the following Formula (I):

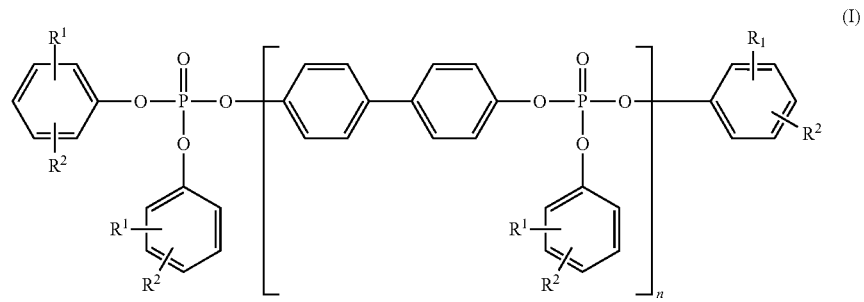

(wherein,
$R^1$ and $R^2$ each independently represent a hydrogen atom or a methyl group; and
n represents a number of 1 to 5).

In the present invention, the amount of phosphoric ester compound represented by the aforementioned Formula (I), wherein n is 1, is preferably less than 90% by mass, and it is preferred that the aforementioned $R^1$ and $R^2$ be a hydrogen atom.

Effects of the Invention

By the present invention, a process of solidifying a phosphoric ester-based flame retardant in which high-level purification is not required and stress load is not employed can be provided.

BEST MODE FOR CARRYING OUT THE INVENTION

The present invention will be described in more detail below.

More particularly, examples of the compound represented by the aforementioned Formula (I) include the following compounds No. 1 and No. 2.

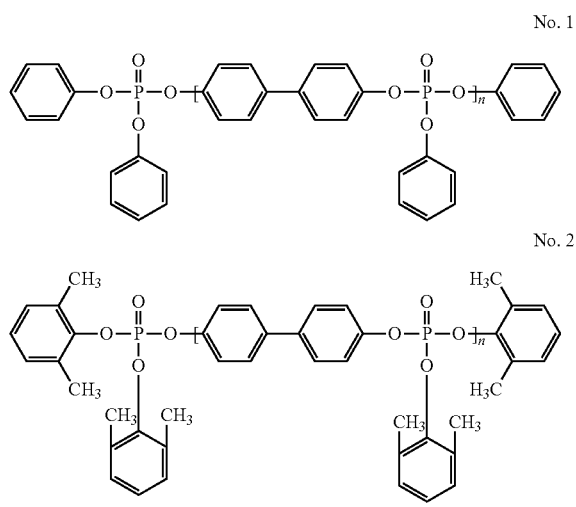

The process of synthesizing the compound represented by the aforementioned Formula (I) is not particularly restricted, and it can be carried out, for example, by allowing 4,4'-dihydroxybiphenyl, phenol and phosphorus oxychloride to react in the presence of a catalyst such as magnesium chloride so as to remove hydrochloric acid, or by an ester exchange reaction between triphenyl phosphate and 4,4'-dihydroxybiphenyl.

As the process of solidifying the compound represented by the Formula (I), the compound can be solidified by cooling it after the synthesis reaction without applying stress load.

In the process of solidifying a phosphoric ester-based flame retardant according to the present invention, in order to facilitate the solidification, seed crystal is added at an amount of 1 to 50 parts by mass, preferably at an amount of 3 to 30 parts by mass, particularly preferably at an amount of 5 to 25 parts by mass, with respect to 100 parts by mass of the reaction product. The effect provided by the addition of seed crystal is limited in cases where the amount is less than 1 part by mass, while in cases where seed crystal is used at an amount of greater than 50 parts by mass, the production efficiency is reduced.

The cooling process is not particularly restricted, and the solidification can be readily achieved using a widely-used solidification device such as a steel belt, where the flame retardant in a molten state is allowed to flow on a metal plate cooled by water or the like, thereby the flame retardant is cooled.

In the process of solidifying a phosphoric ester-based flame retardant according to the present invention, it is preferred that the amount of phosphoric ester compound represented by the aforementioned Formula (I), wherein n is 1, is less than 90% by mass. However, since the solidification is time-consuming at an amount of less than 80% by mass and such an amount is thus not practical, an amount of not less than 80% by mass is preferred.

Phosphoric ester-based flame retardants solidified in accordance with the present invention are effective in making a variety of resins flame retardant, and examples thereof include α-olefin monopolymers or copolymers such as polypropylene, low-density polyethylene, linear low-density polyethylene, high-density polyethylene, polybutene-1, poly-3-methylpentene, poly-4-methylpentene and ethylene-propylene copolymers; multi-unsaturated compounds of these α-olefins and conjugated dienes or non-conjugated dienes; copolymers with acrylic acid, methacrylic acid, vinyl acetate or the like; linear polyesters or acid-modified polyesters such as polyethylene terephthalate, polyethylene terephthalate.isophthalate, polyethylene terephthalate.paraoxybenzoate and polybutylene terephthalate; polyamides such as polycaprolactam and polyhexamethylene adipamide; polyimide; polystyrene; copolymers (for example, AS resin, ABS resin, MBS resin, and heat-resistant ABS resin) of styrene and/or α-methylstyrene with another monomer (for example, anhydrous maleic acid, phenyl maleimide, methyl methacrylate, butadiene and acrylonitrile); halogen-containing resins such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic acid ester copolymers, vinyl chloride-maleic acid ester copolymers, and vinyl chloride-cyclohexylmaleimide copolymers; polymers of (meta)acrylic acid ester such as methyl(meta)acrylate, ethyl(meta)acrylate or octyl(meta)acrylate; thermoplastic resins such as polyether ketone, polyvinyl acetate, polyvinyl formal, polyvinyl butyral, polyvinyl alcohol, linear or branched polycarbonates, petroleum resins, coumarone resins, polyphenylene oxides, polyphenylene sulfides, polyurethanes and cellulose-based resins; thermosetting resins such as epoxy resins, phenol resins, urea resins, melamine resins and unsaturated polyester resins; and further, isoprene rubbers; butadiene rubbers; butadiene-styrene copolymer rubbers; butadiene-acrylonitrile copolymer rubbers; acrylonitrile-butadiene-styrene copolymer rubbers; copolymer rubbers of ethylene and α-olefin such as propylene and butene-1; as well as, elastomers such as terpolymer rubbers of ethylene-α-olefin and non-conjugated dienes such as ethylidene norbornene and cyclopentadiene; and silicone resins. These resins and/or elastomer may be made into an alloy or blended.

The stabilization effect expressed by the aforementioned resins may be variable depending on, for example, stereoregularity, specific gravity, the type of the polymerization catalyst, presence or absence as well as the degree of removal of the polymerization catalyst, the degree of crystallization, polymerization conditions such as temperature and pressure; the type of crystal; the size of lamella crystal measured by X-ray small-angle scattering; the aspect ratio of the crystal; the solubility into an aromatic or aliphatic solvent; the solution viscosity; the melt viscosity; the average molecular weight; the degree of molecular weight distribution; the number of peaks in the molecular weight distribution; whether the copolymer is block or random; and the blending ratio of each monomer. However, even if any of these resins is selected, a phosphoric ester-based flame retardant solidified in accordance with the present invention can be applied.

When applying a phosphoric ester-based flame retardant solidified in accordance with the present invention to a resin, generally, a variety of additives used in each resin are employed as required. Examples of such additives include phenol-based antioxidants, sulfur-based antioxidants, phosphorus-based antioxidants, UV absorbers, other hindered amine compounds, nucleating agents, other flame retardants, flame-retardant aids, lubricants, fillers, fibrous fillers, metallic soaps, hydrotalcites, antistatic agents, pigments and dyes.

Examples of the aforementioned phenol-based antioxidant include 2,6-di-tert-butyl-p-cresol, 2,6-diphenyl-4-octadesiloxyphenol, distearyl (3,5-di-tert-butyl-4-hydroxybenzyl) phosphonate, 1,6-hexamethylenebis[(3,5-di-tert-butyl-4-hydroxylphenyl)propionic acid amide], 4,4'-thiobis(6-tertbutyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, thiodiethylene glycol bis[(3,5-di-tert-butyl-4-hydroxyphenyl)propionate], 1,6-hexamethylenebis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5] undecane, and triethylene glycol bis[(3-tert-butyl-4-hydroxy-5-methylphenyl)propionate]. The phenol-based antioxidant is used at an amount of 0.001 to 10 parts by mass, more preferably 0.05 to 5 parts by mass, with respect to 100 parts by mass of the resin.

Examples of the aforementioned sulfur-based antioxidant include dialkyl thiodipropionates such as dilauryl thiodipropionate, dimyristyl thiodipropionate and distearyl thiodipropionate; and β-alkylmercaptopropionic acid esters of polyols such as pentaerythritol tetra(β-dodecylmercaptopropionate). The sulfur-based antioxidant is used at an amount of 0.001 to 10 parts by mass, more preferably 0.05 to 5 parts by mass, with respect to 100 parts by mass of the resin.

Examples of the aforementioned phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and phosphites of 2-ethyl-2-butylpropylene glycol and 2,4,6-tri-tert-butylphenol. The phosphorus-based antioxidant is used at an amount of 0.001 to 10 parts by mass, more preferably 0.05 to 5 parts by mass, with respect to 100 parts by mass of the resin.

Examples of the aforementioned UV absorber include 2-hydroxybenzophenones such as 2,4-dihydroxybenzophenone, 2 hydroxy-4-methoxybenzophenone, 2-hydroxy-4-octoxybenzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl) acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. The UV absorber is used at an amount of 0.001 to 10 parts by mass, more preferably 0.05 to 5 parts by mass, with respect to 100 parts by mass of the resin.

Examples of the aforementioned other hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl butanetetracarboxylate, tetrakis(1,2,2,6,6-pentamethyl-4-piperidyl butanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-ylamino undecane, and 1,6,11-tris[2,4-bis(N-butyl-N-(1,2,2,6,6-pentamethyl-4-piperidyl)amino)-s-triazine-6-ylamino undecane.

Examples of the aforementioned nucleating agent include metal salts of aromatic carboxylic acids such as aluminium p-t-butylbenzoate and sodium benzoate; metal salts of acid phosphate esters such as sodium bis(2,4-di-tert-butylphenyl) phosphate, lithium bis(2,4-di-tert-butylphenyl)phosphate and sodium-2,2'-methylenebis(4,6-di-tert-butylphenyl)phosphate; polyalcohol derivatives such as dibenzylidene sorbitol and bis(methylbenzylidene)sorbitol; and metal salts of alicyclic carboxylic acids such as disodium bicyclo[2,2,1]heptane dicarboxylate and zinc bicyclo[2,2,1]heptane dicarboxylate.

Examples of the aforementioned other flame retardant include halogen-based flame retardants; phosphorus-based flame retardants such as red phosphorus, melamine phosphate, guanidine phosphate and phosphazene compounds; nitrogen-based flame retardants such as melamine cyanurate; and metal hydroxides such as magnesium hydroxide and aluminium hydroxide. Examples of the flame-retardant aid include inorganic compounds such as antimony trioxide and zinc borate; and drip inhibitors such as polytetrafluoroethylene.

The hydrotalcites may be a natural product or a synthetic product, and such a hydrotalcite can be used regardless of the presence or absence of surface treatment and crystal water. Examples of the hydrotalcite include basic carbonates represented by the following Formula (II):

$$M_xMg_yAl_zCO_3(OH)_{xp+2y+3z-2} \cdot nH_2O \quad (II)$$

(wherein,
M represents an alkali metal or zinc;
x represents a number of 0 to 6;
y represents a number of 0 to 6;
z represents a number of 0.1 to 4;
p represents the valence of M; and
n represents the number of crystal waters at 0 to 100).

Examples of the lubricant include fatty acid amides such as lauryl amide, myristyl amide, stearyl amide and behenyl amide; metallic soaps such as ethylene bis-stearyl amide, polyethylene wax, calcium stearate and magnesium stearate; and metal salts of phosphate esters such as magnesium distearyl phosphate and magnesium stearyl phosphate.

As the filler, an inorganic material such as talc, silica, calcium carbonate, glass fiber, potassium titanate or potassium borate can be used by appropriately selecting the particle diameter in cases where the filler is of a spherical form and by appropriately selecting the fiber diameter, fiber length and aspect ratio in cases where the filler is of a fibrous form. In addition, it is preferred that, as required, a surface treatment be performed on the filler.

EXAMPLES

The present invention will be described in more detail by way of Examples thereof. However, the present invention is not restricted by the following Examples by any means.

Synthesis Example of Phosphoric Ester Compound

To a dihydroxy compound (listed in Table 1), 9.52 g (0.01 mol) of magnesium chloride was added as a catalyst, followed by addition of phosphorus oxychloride at an amount of 6 times by mole of the dihydroxy compound. The resulting mixture was allowed to react at a temperature of 80 to 100° C. for 3 hours. After evaporating the excess phosphorus oxychloride under reduced pressure, a phenolic compound (listed in Table 1) was added, and the resulting mixture was allowed to react at a temperature of 120 to 140° C. for 7 hours. The thus obtained crude product was dissolved in toluene and washed with a solution containing an acid or base. Then, by removing the water content and the solvent, a phosphoric ester compound was obtained. Based on IR and NMR analyses, the thus obtained compound was confirmed to be a phosphoric ester compound represented by the following Formula (III). The purity of the compound represented by the following Formula (III), wherein n is 1, was measured by liquid chromatography.

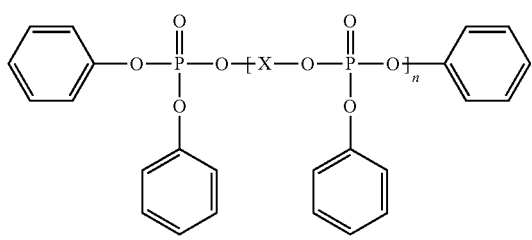

(III)

(wherein,
X represents a residue of the dihydroxy compound; and
n represents an integer of 1 to 5.)

Evaluation of Solidification Characteristics 100 parts by mass of the obtained phosphoric ester compound was stirred at 120° C. for 1 hour to be made into a molten state. Subsequently, the thus molten phosphoric ester compound was cooled to a temperature listed in Table 1 for addition of seed crystal, and seed crystal was added at a blending amount listed in Table 1, followed by stirring of the resulting mixture. The time required for the mixture to become unstirrable was evaluated as solidification time. A shorter solidification time means an industrially more superior solidification condition(s). Here, in consideration of the cooling cost and the like, the evaluation was carried out with the maximum measurement time of 120 minutes. The results are shown in Table 1.

A compound corresponding to one represented by the aforementioned Formula (III), wherein n is 1, was purified using a column and the thus purified compound was cooled at 20° C. for 24 hours to obtain a solid. This solid was grinded and used as the seed crystal.

TABLE 1

| | Examples | | | Comparative Examples | | |
|---|---|---|---|---|---|---|
| | 1 | 2 | 3 | 1 | 2 | 3 |
| 4,4'-dihydroxybiphenyl | 1 mol | 1 mol | 1 mol | 1 mol | — | — |
| Bisphenol A | — | — | — | — | 1 mol | 1 mol |
| Phenol | 4.1 mol | 4.1 mol | 4.1 mol | 4.1 mol | 4.1 mol | 4.1 mol |
| Purity (%) | 86 | 86 | 86 | 86 | 87 | 87 |
| Amount of Seed Crystal (parts by mass) | 10 | 30 | 50 | 0 | 10 | 30 |
| Temperature for addition of seed crystal (° C.) | 30 | 40 | 50 | — | 30 | 40 |
| Solidification Time (min) | 10 | 15 | 30 | 92 | —*¹ | —*¹ |

*¹The mixture was stirrable even after 120 minutes.

From Examples 1, 2 and 3, as well as Comparative Example 1, it is apparent that, in the process of solidifying a phosphoric ester compound according to the present invention in which 4,4'-dihydroxybiphenyl was used, the solidification time varied considerably depending on the presence or absence of the seed crystal, and that the addition of the seed crystal has a superior effect. In addition, from Comparative Examples 2 and 3 where other phosphoric ester compounds having an equivalent purity were not solidified, it was confirmed that only the process according to those Examples where a phosphoric ester compound synthesized from 4,4'-dihydroxybiphenyl derivative is an industrially effective production process.

The invention claimed is:

1. A process of solidifying a phosphoric ester-based flame retardant, wherein a seed crystal is added at a temperature of not higher than 50° C. and at an amount of 1 to 50 parts by mass with respect to 100 parts by mass of a phosphoric ester compound in a molten state, said compound being the same compound as said seed crystal represented by the following Formula (I):

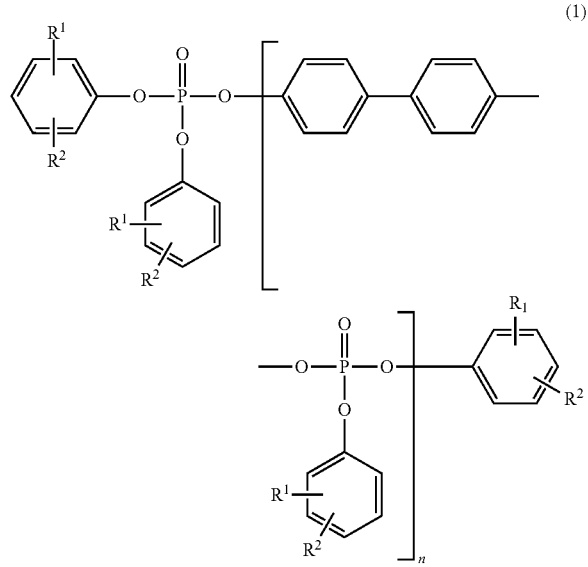

(1)

wherein $R^1$ and $R^2$ each independently represent a hydrogen atom or a methyl group;

n represents a number of 1 to 5; and wherein said phosphoric ester compound represented by Formula (I) is solidified by cooling without employing a kneader device.

2. The process of solidifying a phosphoric ester-based flame retardant according to claim 1, wherein the amount of said phosphoric ester compound represented by the Formula (I) wherein n is 1 is less than 90% by mass, wherein said phosphoric ester compound represented by Formula (I) is solidified by cooling without employing a kneader device.

3. The process of solidifying a phosphoric ester-based flame retardant according to claim 1, wherein said $R^1$ and $R^2$ are a hydrogen atom.

4. The process of solidifying a phosphoric ester-based flame retardant according to claim 2, wherein said $R^1$ and $R^2$ are a hydrogen atom.

5. The process of solidifying a phosphoric ester-based flame retardant according to claim 1 or 2, wherein said seed crystal is represented by the Formula (III):

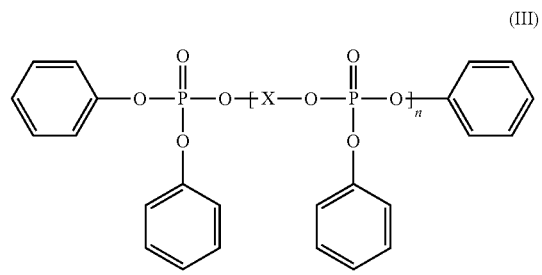

(III)

wherein X represents a residue of a dihydroxy compound, and n represents an integer of 1 to 5.

6. The process of solidifying a phosphoric ester-based flame retardant according to claim 5, wherein X represents a residue of biphenyl.

7. A process of solidifying a phosphoric ester-based flame retardant, wherein a seed crystal, which is represented by compound No. (1), is added at a temperature of 30° C. to 50° C. and at an amount of 1 to 50 parts by mass with respect to 100 parts by mass of a phosphoric ester compound in a molten state, said compound being the same compound as said seed crystal, wherein said phosphoric ester compound represented by the compound No. (1) is solidified by cooling without employing a kneader device:

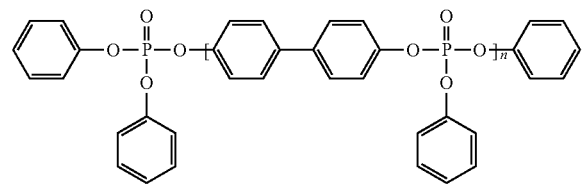

No. 1 wherein n represents a number of 1 to 5.

* * * * *